Dec. 12, 1967   K. F. FRIENDSHIP   3,357,461
AUTOMATIC CONTAINER FILLING CONTROL
METHOD AND APPARATUS
Filed Sept. 30, 1965   2 Sheets-Sheet 1

INVENTOR.
KENNETH F. FRIENDSHIP
BY
*Oldham & Oldham*
ATTYS.

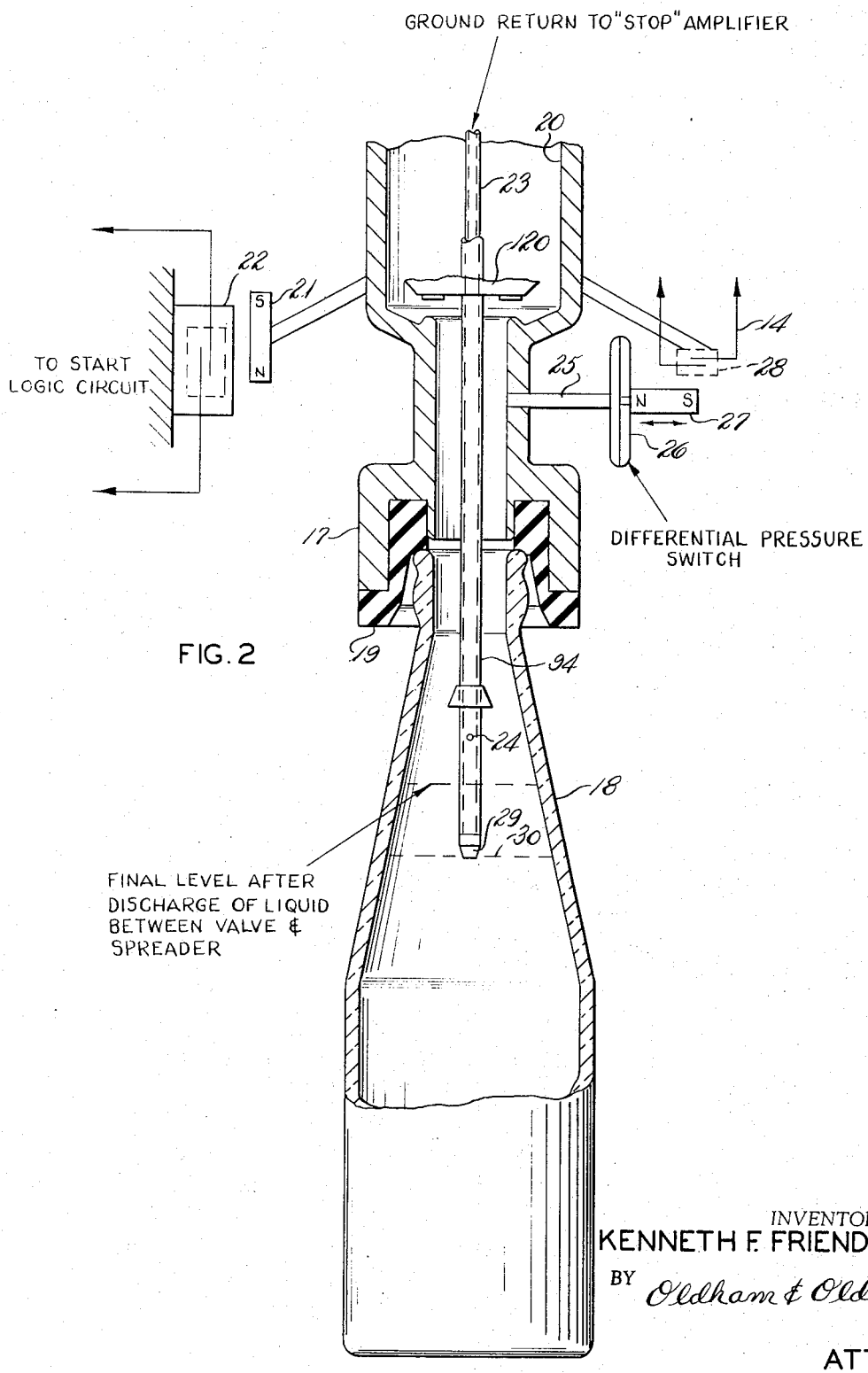

3,357,461
AUTOMATIC CONTAINER FILLING CONTROL
METHOD AND APPARATUS
Kenneth F. Friendship, Akron, Ohio, assignor to Geo.
J. Meyer Manufacturing Co., Cudahy, Wis., a corporation of Wisconsin
Filed Sept. 30, 1965, Ser. No. 491,691
9 Claims. (Cl. 141—6)

The present invention relates to a novel and improved automatic container filling control method for use with carbonated beverages and other liquids.

Heretofore there have been many different types of control apparatus for container filling methods and apparatus that have been proposed and many of such developments are in wide use commercially. However, it is desirable to provide a new and improved method for controlling the fill height and quality of filling, also improvements in hygienic standards for containers, whereby the containers can be filled rapidly and efficiently with liquids. This is particularly important with the present trend for higher operating speeds.

Liquids of the type to which the present invention relates include all carbonated soft drinks, and beer, while wine and other electrically conductive liquids also may be processed by the present invention. In filling containers with carbonated beverages, there always is a problem involved in causing such beverage to flow through the apparatus so as to have rapid bottle filling actions, but with no excessive foaming of the beverage being processed. It also is necessary that the method function rapidly and have proper safeguards to insure safety and minimum loss of beverage under improper operating conditions.

The general object of the present invention is to provide a novel and improved method for controlling the filling cycle when filling containers with beverages, which method is characterized by electronic controls provided for the automatic, rapid container filling action.

Other objects of the invention are to provide electrical control impulses to the individual filling heads to regulate container filling action and to terminate container filling action by an electric impulse transmitted from within a container when it is filled, or when sufficient beverage has flowed past a shut-off valve for filling a container; to provide a control switch in a filling head whereby container filling action cannot occur unless proper pressure exists within a container to be filled and where the filling action can be terminated if the container bursts or is otherwise disassociated from engagement with the filling head; to provide means in association with a filling head for resetting a control circuit whereby the filling apparatus will automatically process, one container only, and arranged so that it cannot again operate until the filled container has been discharged and replaced with a new one and to use conventional electrical components in association with container filling apparatus for controlling electric circuit means to regulate and operate the container filling means and operation.

Another object of the invention is to provide means by the inclusion of suitable switches for the operating cycle to be changed to allow the apparatus to be easily sterilized, and cleaned by "in-place" detergent circulation means, which apparatus is constructed in such a manner that all parts of it that come into contact with beverages are vigorously circulated with detergent or other cleaning materials during that cleaning process.

The foregoing and other objects and advantages of the invention will be made more apparent as the specification proceeds.

The present method is particularly adapted for use with beverages supplied as a steady flowing stream ready for container filling action. In the container filling apparatus, a plurality of individual filling heads are associated with a filling table or station at which a plurality of containers are positioned by suitable means (not shown) on the apparatus for container filling action, and the apparatus functions to move containers into and out of engagement with the individual filling heads.

Obviously the process of the invention can be used for filling any suitable containers such as cans, bottles or the like, with any suitable beverages, or other electrically conductive liquids of the type indicated.

Attention now is particularly directed to the accompanying drawings, wherein:

FIG. 2 is a sectional view, partially diagrammatic, of an apparatus for practicing the process of the invention.

When referring to corresponding members shown in the drawings and referred to in the specification, corresponding numerals are used to facilitate comparison therebetween.

The present invention, generally speaking, relates to a method or process for controlling the filling of containers with a beverage or other liquid supplied continuously under suitable pressure and wherein the containers have a counter pressure set up within them when they are engaged with a filling head for filling action, and where the method comprises the steps of changing an electrical condition in a control circuit when a container is engaged for filling action, providing a second change in the control circuit by the counter pressure in a container to the control circuit which can only operate when the two electrical conditions are changed, actuating beverage flow control means by the changes in the control circuit to release beverage for flow to an engaged container, and transmitting an electrical impulse through the liquid to the control circuit, when a container is filled to a predetermined level with a beverage, to change the actuation thereof and terminate flow of beverage to the container.

Figure 1:
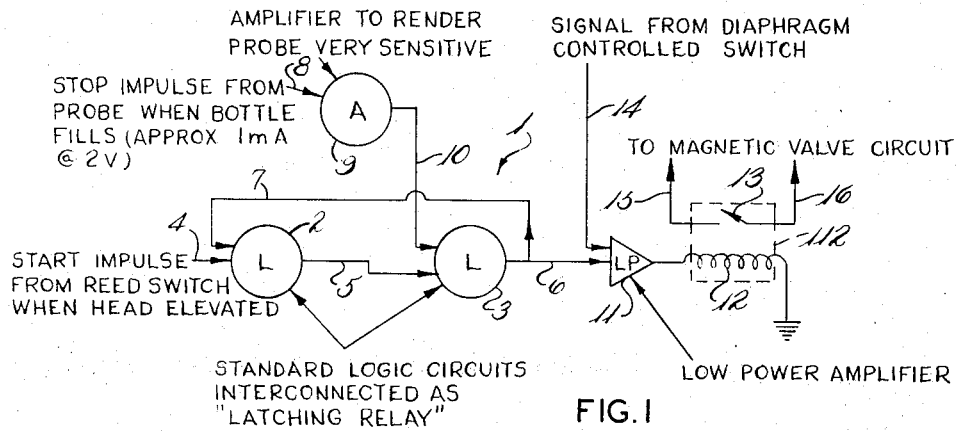
FIG. 1 is a diagrammatic view of one form of circuit means for practicing the process of the invention.

Reference now is made to the details of the control circuit diagrammatically shown in FIG. 1 and referred to as a whole by the numeral 1. This control circuit includes a first logic circuit 2 and a second logic circuit 3. These logic circuits 2 and 3 are interconnected as a "latching relay" control and the first logic circuit 2 is rendered non-conductive when it receives a reset impulse through a lead 4, which lead normally connects to a container filling head to have an impulse supplied thereto only when this head is out of engagement with a container. Output from the first logic circuit 2, when no current is supplied thereto by the lead 4, passes through a lead 5 to the second logic circuit 3, which logic circuit is so constructed and arranged that when current is fed into it only through the lead 5, then no output flows from the logic circuit 3 through its output lead 6. When current flows from the logic circuit 3, it will flow through a by-pass lead 7 back to the first logic circuit 2 as an input therefor to "latch" it in non-conductive condition.

When it is desired to stop power transmission from the logic circuit 3, then a stop impulse is provided from the bottle filling action means as described hereinafter, such as by causing a small current flow when a container is filled with liquid so that an impulse is received through a lead 8 that connects to a standard amplifier circuit 9, the output of which is connected through a lead 10 to the second logic circuit 3 to prevent power from being passed through the logic circuit 3 and terminate its output. The logic control circuit 3 connects by the lead 6 to a standard low power amplifier circuit 11 which in turn is adapted to amplify the signal received and, when electrical current is received as input to the amplifier circuit 11, it will amplify such input signal and power from the amplifier circuit 11 flows through a suitable electric control means, such as a coil 12 of a relay 112 which has a suitable switch 13 associated therewith. The switch 13 normally is open and can only be closed when a predetermined current flows through the coil 12. A further means to prevent the lower power amplifier from operating, and thus passing current to the coil 12 has been incorporated so that when electrical current is passed through a lead 14 to the amplifier 11, the low pressure amplifier cannot pass current to coil 12. The lead 14 in turn extends to and connects to a diaphragm controlled switch that is set up to measure when a predetermined counter pressure is provided within a container being filled with beverage whereby the control circuit 1 will only be conductive and provide beverage for bottle filling actions when predetermined conditions are established in the container to be filled.

The switch 13 has control leads 15 and 16 extending therefrom that connect to a suitable member, such as an electromagnetically controlled valve, that controls flow of beverage to a container for filling action.

When the logic circuit 2 has an electrical condition changed therein, then the control circuit 1 is adapted to be either actuated for filling action, or else to stop the filling action it can be reset to start another filling cycle during the time when no container is associated with the filling head. The usual functioning of the logic control circuit 2 is such so that when a bottle and a filling head, for example, are not operatively associated with each other, then an electrical impulse is supplied through the lead 4 to the logic circuit 2 whereby it has no output and supplies no power to the logic circuit 3 which in this manner will have an output of power. When the logic circuit 2 is not supplying power to the logic circuit 3, the circuit 3 circulates power through the by-pass line 6a to the input of the logic circuit 2, thereby insuring the conductance of power through the line 5, and thus latching the relay system 2 and 3 in this state. Then when the means to which the lead 4 connects are suitably moved with relationship to either the container to be filled or the filling head of the machine, as desired, the change is such that conditions will not interrupt supply of an electric impulse to the logic circuit 3, and thus power will be supplied to the low power amplifier 11 and render the remainder of the control circuit ready for conduction when the lower power amplifier is able to operate.

With reference to FIG. 2, certain means are shown diagrammatically by which some of the functioning of the circuits shown in FIG. 1 is controlled. The apparatus shown includes a portion of a filling head 17 and a container, such as a bottle 18, that is to be filled with a beverage. The filling head 17 and container are suitably controlled by apparatus used for container filling actions and by which the container and filling head are brought into engagement with each other by suitably positioning the containers and then bringing the two into engagement by controlled movement of the bottle filling apparatus. The filling head 17 may have a suitable resilient socket or seat 19 provided at its lower end for sealed engagement with the upper end of the container 18. Beverages are supplied to the interior of a bore 20 of the filling head 17 by suitably controlled means and a valve means 120 normally is positioned within this filling head for controlling flow of the beverages out of the lower end of the filling head. In all events, the apparatus shown includes an electric switch which may in one form of the apparatus be an arrangement incorporating a magnetically operated Dry-Reed switch capable of being controlled by a small permanent magnet, and by way of example in the present instance a permanent magnet 21 that is suitably secured to and moves with the filling head 17. Such magnet is of sufficient strength and it is associated with a conventional normally open dry reed switch 22, or the like whereby such switch will only be closed when the magnet is in closely spaced relation to the switch 22. The switch 22 will normally be open when the filling head 17 is in engagement with the container 18, but is closed when, in this instance, the filling head is moved upwardly out of engagement with a bottle. Hence, an impulse is transmitted through the switch 22 to the lead 4 for transmission to the circuit shown in FIG. 1 when the filling head and container are not in association with each other. Naturally other types of switches can be used rather than the switch and magnet means shown as any type of a contact switch could be provided and only be closed when the filling head is elevated. A suitable counter pressure gas supply means (not shown) is provided for engaging with the upper end of a center tube 23 positioned in the filling head 17 whereby such counter pressure gas will flow through the tube down to a lower section thereof and flow out through a port 24 into the container 18 to set up a predetermined desired counter pressure therein to facilitate filling action. This counter pressure will flow into and fill the container 18 rapidly and it also flows up into the lower part of the interior of the filling head 17 and out through an annular space or tube 25 associated with the filling head to a differential pressure diaphragm or control 26 so that the counter pressure is set up on one side of a resilient diaphragm provided in this control 26. The opposite side of the diaphragm has an appreciably lower pressure than the counter pressure set up thereon, or alternatively, the diaphragm could be spring loaded with a suitable means of adjusting the spring to adapt the apparatus for working with different counter-pressures. This side of the diaphragm will be connected to a further electrical switch and adapted in such a way, that when a counterpressure is set up in a bottle, the diaphragm is depressed against the secondary pressure at its back side or alternatively a spring pressure, previously described in such a manner that the switch is operated. For the purpose of description, this switch and its control may conveniently take the form of a permanent magnet 27, is secured to and operatively carried by diaphragm (not shown) provided in the control 26 whereby such magnet will be moved axially with its position being dependent upon whether the desired counter pressure is set up on the remote face of the diaphragm, or not. The magnet 27 is shown in direct association with a suitable member, such as a switch 28 carried by the filling head, that can be moved to an open position from a normally closed position when the magnet 27 is in predetermined operative relationship therewith. Such condition is only established when the counter pressure in the control 26 has moved the magnet axially outwardly in the manner shown whereby the magnet is directly associated with and adjacent the switch 28 to open it and break a circuit extending through the lead 14 back to the low power amplifier circuit 11 to allow current flow therethrough to energize the coil 12.

Means are also provided in the apparatus disclosed for providing an electrical current to be passed through the liquid to a probe contact 29 incorporated on the end of the tube 23 when enough liquid has reached the container or reached the desired level of liquid in the container being filled. Such circuit means include a circuit formed through the filling tube 23 that is attached to the machine or apparatus of the invention and is of a desired potential and by the contact 29 that is shown suitably secured to and carried by the lower end of the filling tube 23. The contact 29 is adapted to close a circuit through the carbonated beverage, or other conductive liquid introduced into the container 18 when the beverage reaches the level shown at the line 30 in the container. At that instant, beverage still is being supplied to the container and it forms a continuous electrical path extending up into the filling head 17 whereby the beverage is completing the circuit by passing current to line 8, and to the amplifier 9 to cause current to be passed through line 10 to the second logic circuit 3 shown in FIG. 1. Hence, bottle filling action will be stopped by the relay coil 12 being deenergized which in turn will cause the switch 13 to open and demagnetize the electromagnetic valve, and would in turn cause the valve 120 in FIG. 2 to close thus terminating flow of beverage to or through the filling head, and any beverage that has passed by the valve portion of the filling head will then just drain down into the container to fill it to a predetermined level above the line 30. Thereafter, the container or filling head will be disconnected from the now filled container which will be removed out of association with the head and subsequently replaced by a further empty container.

Figure 3:
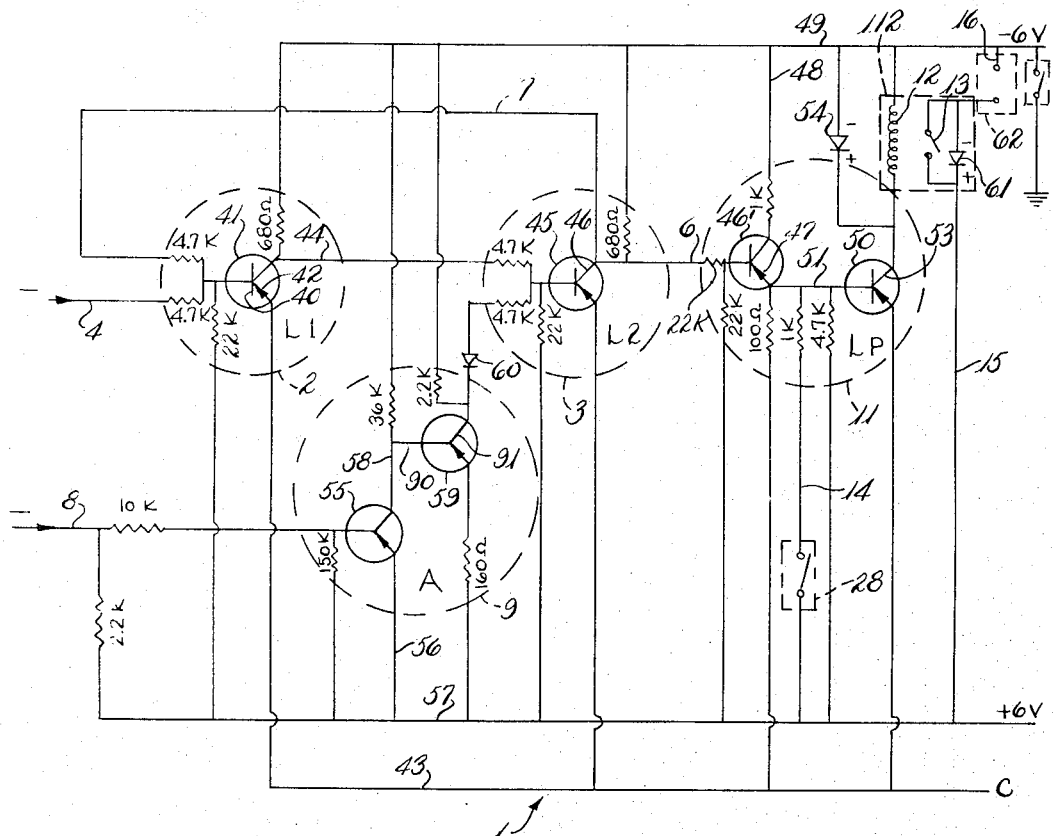
FIG. 3 is one example of circuit diagram details for electronic control means for the process of FIG. 1.

In the detailed wiring diagram shown in FIG. 3, it will be realized that conventional circuit components have been provided and only the major components will be specifically identified. Thus, the reset impulse to the control circuit, indicated as a whole by the numeral 1, would come in through the lead 4 to enter the first logic circuit which is indicated as a group by the dotted line. This input impulse passes to a base 40 of a transistor 41 which has an emitter 42 connected to a suitable power lead 43. A collector 44 of the transistor 41 is connected through the lead 5 to the base of a second transistor 45 that is a part of the logic circuit 3. The emitter for this transistor 45 is connected to the lead 43 and a collector 46 of the transistor connects to the leads 6 that in turn connects to the base of a transistor 46' that forms a part of the low power amplifier circuit 11. The low power amplifier consists essentially of the transistor 46' acting as an emitter follower, and a transistor 53 acting as a transistor invertor. Output from the transistor 46' flows from its emitter 47 to the base of a transistor 50 through line 51. The transistor 50 has its emitter connected also to line 43, and passes current from its collector 53 to the coil 12. Thus, when current passed by the collector of this transistor causes the coil 12 to be energized, the other end of the coil being connected to the negative power supply which in turn causes the switch 13 to be closed. A diode 54 is connected across the relay coil 12 to pass any inductance current when the coil is opened.

The amplifier circuit 9 includes a transistor 55 which has its base connected to the lead 8 for receiving a small current therefrom and the emitter of the transistor is connected by a lead 56 to a power supply lead 57. Output from the transistor 55 flows through a lead 58, to the lead 90; to the base of a second transistor 59 which has its emitter connected to the power supply lead 57 and the collector of the transistor 59 connects to the lead 91 which conducts current to the base of transistor 45 being the second logic circuit 3. Thus, when a small current is passed through lead 8 to the amplifier, this current is amplified to one suitable to operate the second logic circuit 3 as previously described; which in turn causes power to be stopped by the low power amplifier and to deenergize coil 12. The current feed from the collector of transistor 59 is through a diode 60 to ensure that only current of negative potential can be passed to the base of the transistor 45, thus preventing any inter-action between the amplifier and logic circuit.

A diode or rectifier 61 is connected across the switch 13 to protect it from arcing when it is opened.

The actual flow control means, such as a magnetic valve 62, is connected to the power supply leads 49 and 57 by the leads 15 and 16.

The tube 23, FIG. 2, in addition to conducting counterpressure to the container as previously described, forms the return path for the current controlling the second logic circuit 3, FIG. 1, through to amplifier 9, FIG. 1, negative potential power being obtained through the metal filling head 17, and by conductance through the beverage or liquid when it reaches the metal contact 29 attached to the tube 23. In order to prevent a short circuit of current between the filling head 17 and the tube 23 during the filling process, prior to the time the correct level has been reached, an insulating sheath or coating 94 is provided covering the entire length of the tube 23 except for the exposed contact 29, and an electrical connection at the upper end of tube 23 which is connected to lead 8, FIG. 3.

It will be realized that the circuitry shown has suitable resistances provided therein and that these resistances normally should be of about the values indicated on the drawing and be connected as shown, but this circuit is provided only as an example of a typical control circuit embodying the details of the circuit shown diagrammatically in FIG. 1 to provide the actions described.

It will be seen that individual control circuits are provided for each individual filling head in the apparatus used in practice of the invention. Such filling heads hence are individually controlled to regulate the supply of beverage or other liquids to the individual filling heads to fill a provided container with liquid to the desired level. Thereafter, the bottles or other containers can be suitably processed in any conventional manner for capping or closing the containers to complete them for sales purposes. Usually after the container has been filled to a desired level with the beverage in accordance with the principles of the present invention, then the container and filling head are rapidly separated from each other whereby the counter pressure gas as applied to the beverage will be instantaneously removed.

While one complete embodiment of the invention has been disclosed herein, it will be appreciated that modification of this particular embodiment of the invention may be resorted to without departing from the scope of the invention as defined in the appended claims.

What is claimed is:

1. A method of filling containers with a beverage supplied continuously under pressure when the containers have a counter pressure set up within them when they are engaged for filling action, comprising the steps of changing an electrical condition in a control circuit which can only operate when said electrical condition is changed when a container is engaged for filling action, closing a part of said control circuit by said counter pressure to render it conductive, actuating beverage flow control means by said control circuit to release beverage for flow to an engaged container, providing an electrical impulse when a container is filled with a beverage, and transmitting said impulse to said control container to render it non-conductive and terminate flow of beverage to said container.

2. A method as in claim 1 including the step of providing a shut-off electrical impulse to the control circuit if the counter pressure in a container falls below a predetermined value.

3. A method of filling containers with a beverage supplied continuously under pressure when the containers have a counter pressure set up within them when they are engaged for filling action, comprising the steps of changing an electrical condition in a control circuit when a container is engaged for filling action, providing an operative electrical impulse by said counter pressure to the control circuit which can only operate when said electrical condition is changed, actuating beverage flow control means by said electrical impulse to release beverage for flow to an engaged container, providing a second electrical impulse when a container is filled with a beverage, and transmitting said second impulse to said control circuit to overcome said first impulse and terminate flow of beverage to said container.

4. A method of automatically filling containers with a beverage supplied under pressure wherein containers are provided for engagement by filling heads comprising the steps of changing an electrical condition in a control circuit when a container is engaged with a filling head for filling action, setting up a counter pressure within the engaged container, providing an electrical impulse by said counter pressure to a control circuit which can only operate when said electrical condition is changed, actuating beverage flow control means by said electrical impulse to release beverage for flow to an engaged container, providing an electrical impulse by closing an electrical circuit through the beverage in the container when a container is filled with a beverage, transmitting said second impulse to said control circuit to overcome said first impulse and terminate flow of beverage to said container, and resetting the control circuit by re-establishing the said electrical condition in the control circuit when the filling head releases the filled container.

5. A method of automatically filling containers with a beverage supplied under pressure wherein containers are provided for engagement by filling heads comprising the steps of changing an electrical condition in a control circuit when a container is engaged with a filling head for filling action, setting up a counter pressure within the engaged container, providing an electrical impulse by said counter pressure to a control circuit which can only operate when said electrical condition is changed, actuating beverage flow control means by said control circuit to release beverage for flow to an engaged container, providing an electrical impulse by closing an electrical circuit through the beverage in the container when a container is filled with a beverage, transmitting said second impulse to said control circuit to overcome said first impulse and terminate flow of beverage to said container, and resetting the control circuit by re-establishing the said electrical condition in the control circuit when the filling head releases the filled container.

6. A control method of automatically filling containers with a beverage supplied under pressure wherein containers are provided for engagement by filling heads and are released where filled and an empty container is then engaged by the filling head, comprising the steps of changing an electrical condition in a control circuit when a container is engaged with a filling head for filling action, setting up a counter pressure within the engaged container, terminating an electrical impulse by said counter pressure to a control circuit which can only operate when said electrical condition is changed and the said impulse is terminated, actuating beverage flow control means by said control circuit to release beverage for flow to an engaged container, providing an electrical impulse by closing an electrical circuit through the beverage in the container when a container is filled with a beverage, transmitting said second impulse to said control circuit to terminate flow of beverage to said container, disengaging the filling head and filled container, and resetting the control circuit by re-establishing the said electrical condition in the control circuit when the filling head and filled container are disengaged whereby the apparatus is prepared for another operating cycle.

7. In container filling apparatus including filling heads movable downwardly to engage a container for container filling action, electrically controlled valve means for controlling flow of beverage through the filling head, electric circuit means for controlling actuation of said valve means connected thereto, switch means connected in said electric circuit means to change conditions therein when the filling head engages a container to enable said valve means to be actuated for beverage flow, means for setting up counter pressure in an engaged container, second switch means connected to said circuit means and controlled by said counter pressure in an engaged container to permit actuation of said valve means for beverage flow only when a predetermined counter pressure exists in an engaged container, and means carried by the filling head and extending into an engaged container for indicating when an engaged container is filled with beverage and connected to said circuit means to change such circuit means to close said valve means at such time.

8. In container filling apparatus including filling heads for engaging a container for container filling action, electrically controlled valve means for controlling flow of beverage through the filling head, means for setting up counter pressure in an engaged container, electric circuit means for controlling actuation of said valve means connected thereto, said circuit means including switch means connected in said electric circuit means to change conditions therein to enable said magnetic valve means to be actuated for beverage flow when a filling head engages an empty container, second switch means connected in said circuit means and controlled by said counter pressure in an engaged container to permit actuation of said valve means for beverage flow only when a predetermined counter pressure exists in the engaged container, and means for forming a circuit through liquid in the engaged container for indicating when the engaged container is filled with beverage connected to said circuit means to change such circuit means to close said valve means.

9. In a container filling apparatus including filling heads individually engageable with containers positioned in the apparatus by relative movement therebetween for container filling action, electrically controlled valve means for regulating flow of beverage to a filling head for container filling action, electric circuit means connected to said valve means to open such means for container filling action only when said circuit means are conductive, control means associated with each said filling head and connected to said circuit means to prepare it for conduction when a container is engaged by said filling head, a counter pressure supply means carried by each of said filling heads and extending axially therefrom for insertion into a container engaged by such filling head, a counter pressure controlled switch carried by each of said filling heads and connecting to any container engaged thereby to receive the counter pressure therein, such switch connecting to said circuit means to render it conductive when a predetermined counter pressure is established and said control means are properly positioned, and electrical means connected to said counter pressure supply means and to said electric circuit means to render such electric circuit means non-conductive and to de-energize said valve means when the container is filled with beverage.

References Cited
UNITED STATES PATENTS

| | | | |
|---|---|---|---|
| 2,081,651 | 5/1937 | Tamminga et al. | 141—59 |
| 2,745,585 | 5/1956 | Lindars | 141—40 |
| 2,764,333 | 9/1956 | Schnehain | 141—160 X |

SAMUEL ROTHBERG, *Primary Examiner.*

E. J. EARLS, *Assistant Examiner.*